March 30, 1926. 1,579,038
C. H. SMOOT
MOTOR REGULATOR
Filed Feb. 27, 1925 2 Sheets-Sheet 1
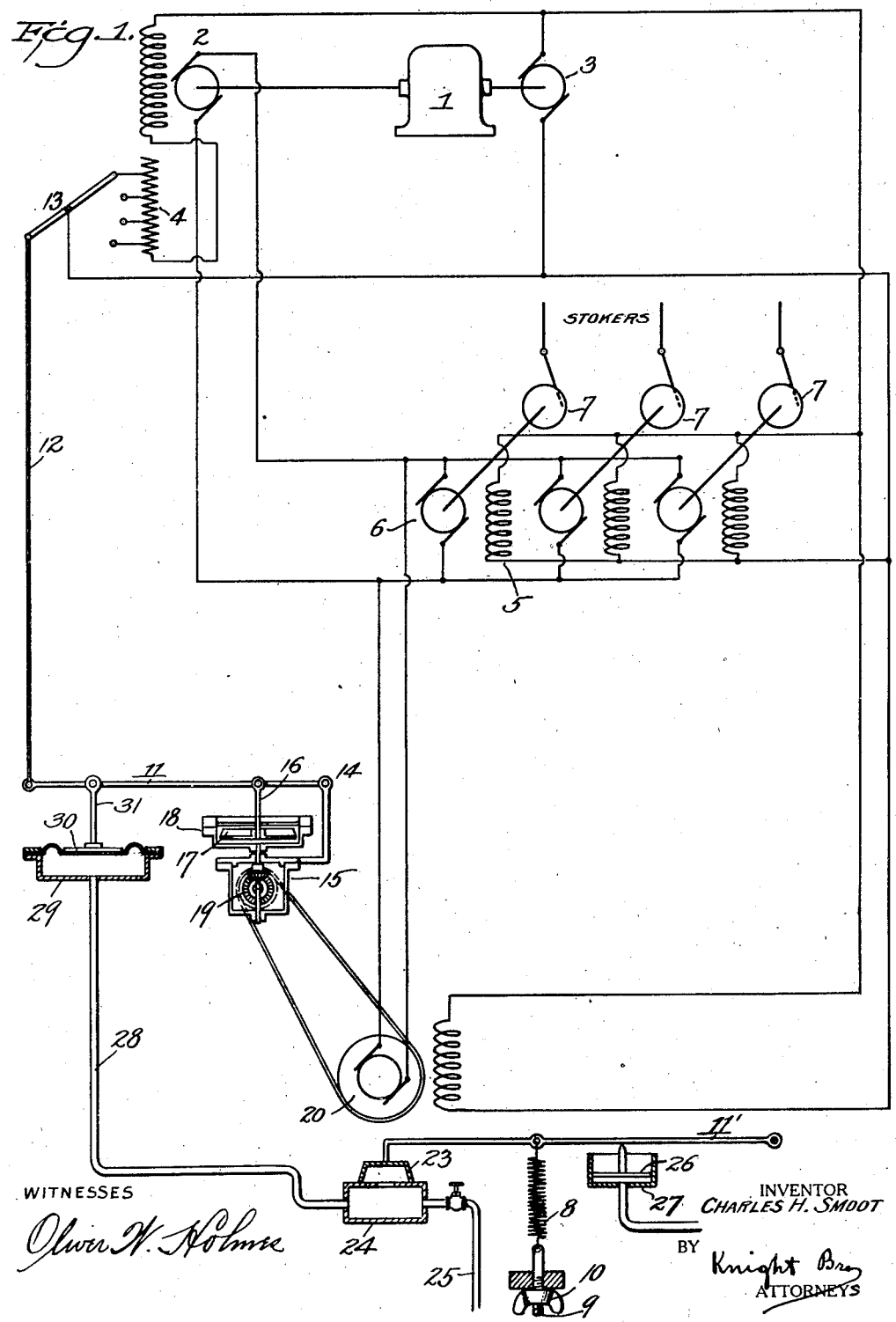
WITNESSES
Oliver W. Holmes
INVENTOR
CHARLES H. SMOOT
BY
Knight Bros
ATTORNEYS

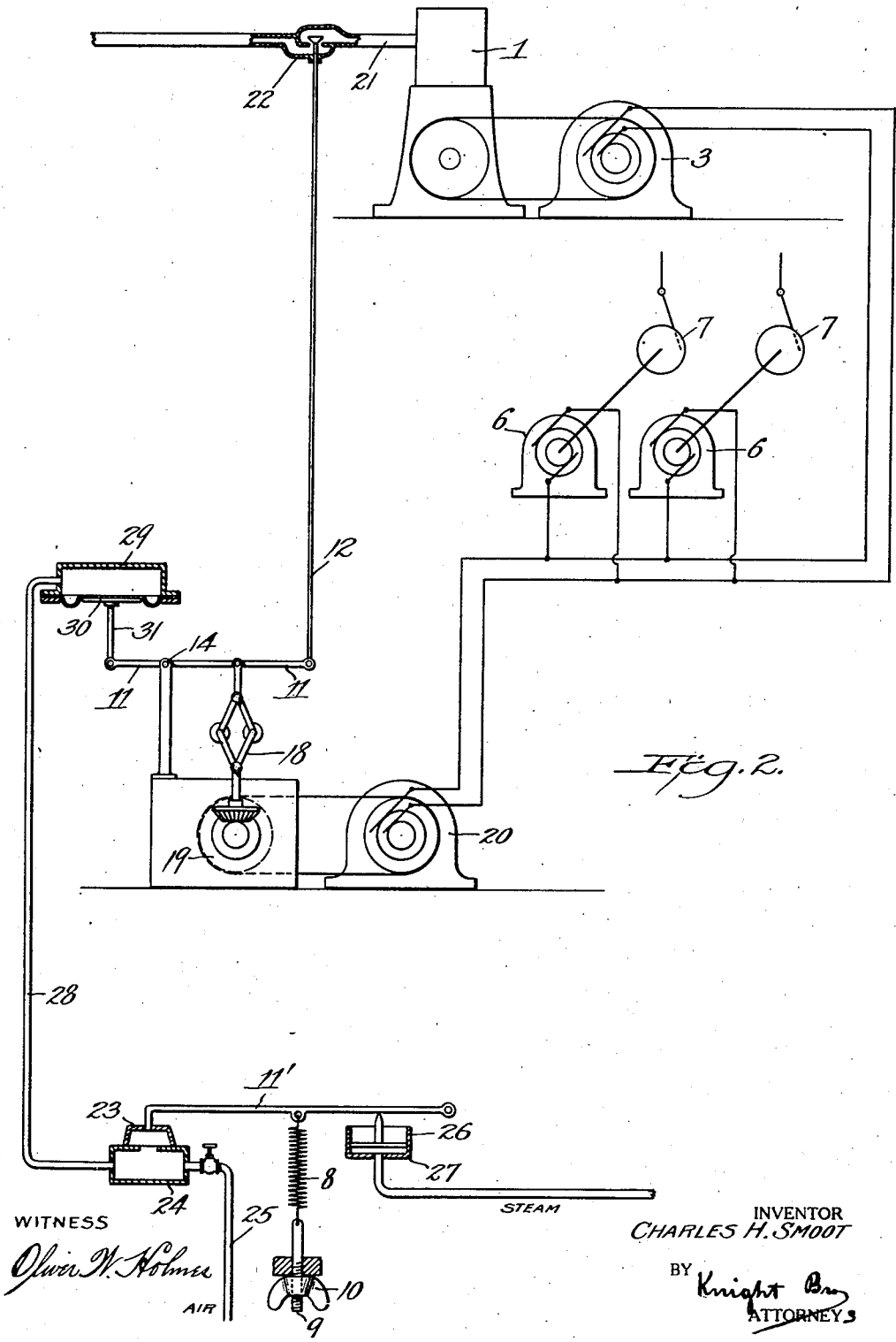

Patented Mar. 30, 1926.

1,579,038

UNITED STATES PATENT OFFICE.

CHARLES H. SMOOT, OF MAPLEWOOD, NEW JERSEY.

MOTOR REGULATOR.

Application filed February 27, 1925. Serial No. 12,112.

*To all whom it may concern:*

Be it known that I, CHARLES H. SMOOT, a citizen of the United States, and a resident of Maplewood, county of Essex, State of New Jersey, have invented certain new and useful Improvements in Motor Regulators, of which the following is a specification.

In systems of electric motor drives where the requirements call for variable speed motors, there arises the problem of controlling such motors from a central point to the end that the motors will at all times meet the requirements.

This invention relates to the control of variable speed motors where the speed of the motors varies with variations in the character of the current supply. The motors may, for example, be supplied with variable voltage from a D. C. variable voltage generator, which generator may be driven at constant speed by an electric motor or a prime mover, or the source of electricity may be an A. C. generator running at variable speed so that all A. C. motors on the circuit will vary in speed with the change in frequency of the generator. It is desirable to control the speed of the motors in accordance with the demands. Such control will be best accomplished by having means for varying the current supplied to the motors controlled by means responsive to the requirements with counteracting means responsive to the speed of the motors for checking the changing effort when the desired speed has been obtained.

In my present invention I propose to check the means regulating the speed of such motors by means of a speed governor driven by an electric motor connected in circuit with the variable speed motors and running at a speed proportional therewith.

In the accompanying drawings:

Figure 1 represents diagrammatically the invention applied to D. C. apparatus.

Figure 2 represents diagrammatically a system using A. C. current.

Referring first to Figure 1, a motor 1 drives a variable voltage generator 2 and an exciting generator 3. The voltage of the generator 2 is varied by means of a variable resistance 4 in the field circuit, current for which is derived from the exciter 3. The exciter 3 also energizes the fields 5 of the variable speed motors 6 used to drive, for example, stokers 7. The variable resistance or other equivalent device 4 is, through lever 13, rod 12 and lever 11, under the control of a regulating device which may, for example, be a master controller having a spring 8 regulated in tension by an adjusting screw 9 and wheel 10. The lever 11, pivoted at 14 on a frame 15, is articulated by rod 16 with a disk 17 immersed in a liquid in a rotatable casing 18. This casing is driven by bevel gears 19 from a motor 20 which is operated from the same circuit as the variable speed work motors and runs at a speed proportional therewith. An increase in the speed of the governor motor will, by increasing the speed of the casing 18, cause the liquid in the casing to pass out from under the disk 17 and tend to bring about a lowering of the disk.

The means for operating the control lever 11 by the master controller may consist of a cup valve 23 controlling the escape of compressed air from a chamber 24 supplied from a pipe 25. The lever 11' tends to hold the valve closed under the action of the spring 8 that is attached to it, while a piston or diaphragm 26 closing a chamber 27 which is connected with the steam main tends to open the valve against the force of the spring. The chamber 24 is connected by pipe 28 with chamber 29 closed by a diaphragm 30 which in turn is connected by rod 31 with the rheostat control lever 11. Any variation in steam pressure from normal in chamber 27 will cause an inverse variation in air pressure at much greater ratio in chambers 24 and 29. This will cause a motion of the diaphragm 30 and levers 11 and 13 so that the tendency will be to set the rheostat 4 to a position that will bring about a speed of the stoker motors suitable to feed the right amount of fuel to the furnace to correct the variation and bring the steam pressure back to normal.

While the master controller may thus be employed to cause a variation in the speed of the motors, it is necessary to have a check upon this control which checking means shall be responsive to the speed of the motors and shall act to arrest the speed-changing means when the required speed of the motors has been reached. It is for this purpose that the speed governor described above is employed, and the lever 11 is acted on jointly but oppositely by the force responsive to the variation in the thing to be controlled (for example the steam pressure) and the force responsive to the variation in the speed of the motors that are to bring about a correction of the variation of the thing being controlled. When the two forces are in equilibrium the adjustments are such that the motors will be operating at a speed that will be just right for the requirement of the thing being controlled.

The motor 20 for driving the centrifugal governor 18 may be quite small and located at a remote point from the work motors. It may, therefore, be closely associated with a master controller at a central point and yet, being operated by the same circuits that operate the work motors, it will run at proportionate speed therewith and give a means at the central control for establishing a definite relation between the adjustment and the work.

The system just described in connection with Figure 1 involves the well known method of variable speed motor drives known as the Ward Leonard system. For alternating current motors instead of running the generator at constant speed and varying the voltage by field control, it is desirable to vary the speed of the motors by varying the speed of the generator, the speed of the motors being in this case always proportional to the speed of the generators. The voltage of such variable speed generators will vary also with the speed.

In Figure 2 is shown a system wherein the motors 6 are of the alternating current type, either synchronous or induction, and are connected to work as at 7, which is shown as the driving part of the furnace stokers. These motors are supplied with current from alternating current generator 3, driven by a prime mover 1 which, in this case, is shown as a steam engine supplied with steam through pipe 21, controlled by a throttle valve 22. At 20 is shown an alternating current motor running either synchronously or at proportional speed with motors 6 and driving a centrifugal governor mechanism consisting of gearing 19, centrifugal member 18, and levers and connecting rods 11 and 12, the rod 12 being connected to the throttle valve 22 in such a way that the increased pull of the governor 18, due to increased speed of the motor 20, will tend to close the throttle, thus slowing down the prime mover 1 and the generator 3, resulting in a decrease in speed of the motors 6. This will naturally also result in a decrease in the speed of the motor 20, which will tend to check any further increase in pull of the centrifugal governor 18 at a point where the speed of the motors 6 reaches the required conditions. The same master controller means as described above for the D. C. motors is shown for supplying the force responsive to the variation in the thing to be controlled, the same reference numbers indicating the same parts. The diaphragm 30 is connected by rod 31 to the lever 11 in such a way as to oppose or balance the action of the centrifugal governor 18. Thus, a rise in steam pressure, due to a decrease in load on the boiler and calling, therefore, for a reduction in fuel consumption, and, consequently, a reduction in the speed of the stokers will result in a lifting of the lever 11' against the loading spring 8, which in turn will result in a greater escape of air past valve 23 and a lowering of air pressure in chambers 24 and 29. This will result in a lesser pressure against diaphragm 30, which will thus offer a less resistance to the action of the centrifugal governor 18 tending to close the throttle valve 22. The throttle valve 22 will, in closing, slow down the engine 1 and the resulting speed of generator 3 will reduce the speed of the motors 6 and the stokers 7. Simultaneously, the control motor 20 will also be reduced in speed proportionately to the reduction in speed of the motors 6 and this will cause a reduction in speed of the governor 18, which will check its tendency to close the throttle valve 22 at the point called for by the adjustment of the loading device, which in this case is represented by the spring 8. When the steam pressure falls, due to increase in load on the boilers, the reverse actions will take place.

In both Figure 1 and Figure 2, it will be seen that I have shown means responsive to work requirements for example the diaphragm 30 to cause a change in the speed of variable speed motors combined with means responsive to the speed of such motors for example the governor 18 for checking the first-mentioned means, and it is to be noted that the centrifugal governor means and the adjustable loading means may be at a central point of control, remote from the point where the work is being done. This feature is rendered possible by the use of the auxiliary motor 20, which although associated with the controlling means and, therefore, remote from the working motors, still runs at proportional speeds with said motors so that I have provided at the control point, a means responsive to the same variations as the work motors.

I claim:—

1. In a control system for variable speed motors, the combination comprising a generator supplying variable voltage, means for varying the voltage of the generator, means responsive to work requirements for adjusting such variation means, centrifugal governor means for counter-balancing said adjusting means, and variable speed electric motors in circuit with the said generator, one of which is used for driving the centrifugal governor means.

2. In a regulator for remote control of variable speed motors, the combination comprising a generator supplying variable voltage, a controller for varying the voltage of the generator, means at the controller for adjusting the voltage to the requirements, centrifugal means also at the controller for checking said adjusting means, variable speed work driving motors in circuit with said generator, and an electric motor at the controller in circuit with the work motors and running at proportionate speed therewith for driving the centrifugal checking means.

3. In a control system for variable speed motors, the combination comprising a generator supplying variable voltage, means for varying the voltage of the generator, motors in circuit with said generator, working mechanism driven at variable speed by said motors, control means located remote from the motors for adjusting the voltage varying means, said control means having members responsive to the work requirements, and other means responsive in speed to the variation in voltage for checking said work requirement means.

4. In a control system for variable speed motors, the combination comprising a generator supplying variable voltage, means for varying the voltage of the generator, variable speed motors in circuit with said generator, working mechanism driven at variable speed by said motors, control means located remote from the motors for adjusting the voltage varying means, said control means having members responsive to the work requirements, a speed governor connected with the same and operated by one of the variable speed motors to check said work requirement means when the speed of the motors meets the work requirements.

5. In a regulator, the combination comprising one or more variable speed motors, a generator supplying the same with variable voltage, means for varying the voltage of the generator, means for adjusting such variable means, centrifugal governor means for counterbalancing said adjusting means, and an electric motor in circuit with the said motors and running at proportionate speed therewith for driving the centrifugal governor means.

CHARLES H. SMOOT.